Figure 1:
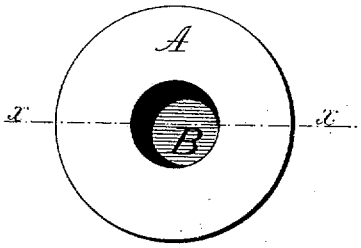

F. PENTLARGE & P. HIRSCH,

Assignors, by mesne assignments, to said F. PENTLARGE.

VENT BUNG.

No. 10,175. Reissued Aug. 1, 1882.

WITNESSES:
Wm. R. Beeston
Henry C. Fischer.

INVENTORS:
Frederick Pentlarge
Philipp Hirsch.

N. PETERS. Photo-Lithographer, Washington, D. C.

UNITED STATES PATENT OFFICE.

FREDERICK PENTLARGE AND PHILIPP HIRSCH, OF BROOKLYN, NEW YORK, ASSIGNORS, BY MESNE ASSIGNMENTS, TO SAID FREDERICK PENTLARGE.

VENT-BUNG.

SPECIFICATION forming part of Reissued Letters Patent No. 10,175, dated August 1, 1882.

Original No. 192,386, dated June 26, 1877; Reissue No. 9,733, dated May 31, 1881. Application for reissue filed July 3, 1882.

*To all whom it may concern:*

Be it known that we, FREDERICK PENTLARGE and PHILIPP HIRSCH, both of Brooklyn, in the county of Kings and State of New York, heretofore invented an Improvement in Vent-Bungs, and duly assigned the same to the said Frederick Pentlarge, to whom Letters Patent therefor were afterward issued under date of June 26, 1877, numbered 192,386; and be it further known that the following is a correct specification and description of said invention.

The invention consists of a bung bored, cut, or otherwise excavated from both sides from the surface toward the interior, but leaving intact a thin web or segment, being a part and portion of the original substance of the bung, included between the line of the bottom of the upper bore, cut, or cavity and the upper line of the bottom bore, cut, or cavity unsevered, this partition being of a thinness not requiring such a blow to break or detach it as would fracture the remaining portion of the bung, and of a thickness adequate to prevent the passage of gas or liquid either way. Until so ruptured the uncut web or partition remains in place to intercept and prevent the passage of gas or liquid one way or the other and to re-enforce the bung when driven tightly into the cask or other receptacle in which the bung is placed. For the latter purpose we locate the web of wood in the portion of the bung where the web will perform the most effective service in contributing strength to the structure; but when venting is desired, upon applying a smart blow or pressure the uncut web or segment yields an immediate aperture and vent, and the structure remaining becomes an efficient receptacle for the venting-tube, if a venting-tube be used. Thus the uncut web or segment is detached and forced through and its place supplied by the venting-tube, so that by the same act and movement a strong and efficient bung-stopple is instantly transformed or developed into a complete and effective venting apparatus. The diameter of the upper bore or cavity is determined by the size of the venting-tube or vent intended to be used. The tubes used in the top of a cask to facilitate venting are usually of two sizes—one of a diameter of about five-eighths of an inch, the other eleven-sixteenths of an inch. In making the bungs the only direction needed is that the upper bore should be made about one thirty-second of an inch larger than the diameter of the nozzle of the venting or ventilating tube, as in driving bungs there will be further compression even in compressed bungs. When other sizes of vent-tubes shall be used the bore can be made without further direction. The size of the lower bore, cut, or cavity may be the same as the upper one; but a better effect and working of the bung is obtained, and also the bung is more easily extracted after use, by making the diameter of the lower bore, cut, or cavity greater than that of the upper one, so that the segment of the bung forced in at venting comes away with ease and makes a cleaner break. We make the web in thickness about three-sixteenths of an inch when made in the best way of the best material—that is, of whitewood or poplar. Should material be employed somewhat weaker, as may happen, the web must be made a little fuller or thicker, and vice versa. If larger tools than those now in use should require larger holes in the bungs, then the web would require thickening to meet that occasion.

In order to clearly "distinguish from other inventions" our invention and "explain the principle thereof and the best mode of applying that principle," as required by section 4,888 of the Revised Statutes, we wish to say: Bungs have been constructed with a center plug and the bungs bored nearly through, leaving an unbored portion at the lower surface; but in these, almost invariably, when the plug is forced through, the unbored portion proves imperforate and the bung suffers a fracture clear across the bung, and the bottom of the bung imperforated falls into the cask or other receptacle. A bung made as we make it under our Letters Patent remains unbroken and perfect as a bung-stopple, while the center web is perforated readily, and there is thrown into the cask only very small splinters of the web, which are readily washed out at the bung-hole, whereas the fragments broken from the lower part of the aforesaid plug-bungs are with great difficulty extracted from the cask, the large size of these fragments preventing their removal until tools are inserted through the bung-hole to cut them into pieces small enough to be washed out. This cutting is only done at the expense of the interior pitching, which is so commonly used in casks in which vent-bungs are needed. With the imperforate bottom there is danger of fracture of that part from compression also. It is apparent that the security afforded against these dangers of fracture of the bung and the filling with large fragments of wood the cask in which the bung is used is of high importance; and this advantage belongs to the bung described now and in our original Letters Patent.

When, to provide entrance into or exit out of a cask or other receptacle, a vent is made through the bung of the receptacle, by necessity the bung is cut, bored, or excavated in some way, and thereby weakened as a bung. Some structure must be devised wherein re-enforcement of the weakened bung against side pressure will prevent collapse, while facility of perforation in venting by the ordinary tool is also secured. Before the present invention resort was had to a plug driven into the center of the bung for re-enforcement, with or without boring through the lower section of the bung, which, as we showed before, is broken off in venting, if not bored. Under the venting-tool it would fracture in the same way. This method is shown both in the English Patent No. 1,955 of 1864 and in the American Reissue Patent No. 5,937, dated June 30, 1874; and in such cases the machine consists of two parts. In the present invention we dispense entirely with the center plug. To insert it in either the lower or upper cavity of our bung would be superfluous; all of its functions, so far as they are important, being secured in the operation of our center web. Instead of two parts, we have now but one structure—a bung-stopple which remains unfractured both before and after venting, first re-enforced by the frangible center web, and then furnishing in the remaining structure a seat to the tool inserted, which furnishes the inlet and outlet of the cask. Notwithstanding this combination of functions, the structure itself possesses the greatest simplicity, and is therefore more valuable.

Our bung is useful whether venting, in the common English sense, is made of the liquid escaping from within out of the receptacle, in which case the bung is usually put in the head of the cask, or used for the purpose of giving access of air from without, in which case the bung is usually inserted in the stave.

Figure 2:
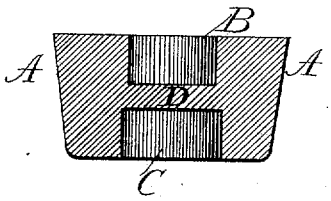

The annexed drawings, Figures 1 and 2, represent respectively a top view and a vertical section of bungs as we have said it is better to construct them and which are illustrations of our said invention.

In said figures, the letter A indicates the body of the bung; D, the uncut transverse web, and B and C the opposing cavities.

We claim that the following is what is new and useful in our said invention:

1. In a vent-bung made and constructed substantially as described, a transverse web having recesses formed respectively upon its inner and outer faces.

2. In a vent-bung made and constructed substantially as described in Figs. 1 and 2, the recess C on one side of the bung, of greater size than the recess B on the other side of the bung.

FREDERICK PENTLARGE.
PHILIPP HIRSCH.

Witnesses:
WM. R. BEESTON,
LEON HIRSCH.